United States Patent

[11] 3,589,339

| [72] | Inventor | Gerald L. Schoen |
| | | Kaukauna, Wis. |
| [21] | Appl. No. | 875,005 |
| [22] | Filed | Nov. 10, 1969 |
| [45] | Patented | June 29, 1971 |
| [73] | Assignee | Badger Northland Inc. |
| | | Kaukauna, Wis. |

[54] RESILIENT BAFFLE-TYPE RECIPROCATING THROUGH LIVESTOCK FEEDER
1 Claim, 7 Drawing Figs.

| [52] | U.S. Cl. | 119/56 |
| [51] | Int. Cl. | A01k 5/02 |
| [50] | Field of Search | 198/218–224, 67 X, 212, 218; 119/51, 52, 56, 51.11 |

[56] References Cited
UNITED STATES PATENTS

| 2,495,096 | 1/1950 | Grimaldi | 198/224 |
| 3,077,995 | 2/1963 | Booth et al. | 198/224 X |
| 3,366,223 | 1/1968 | Haen | 119/56 X |
| 3,403,773 | 10/1968 | Loesch et al. | 119/56 X |
| 3,419,130 | 12/1968 | Ferris | 198/67 |
| 3,443,547 | 5/1969 | Ferris et al. | 119/52 |
| 3,464,390 | 9/1969 | Ferris et al. | 119/56 |

Primary Examiner—Aldrich F. Medbery
Attorney—Gerhardt, Greenlee & Farris

ABSTRACT: A baffle-type feeder with an open-ended elongated tray mounted on rails, drive means to reciprocate the tray back and forth along the rails, and a plurality of baffles pivotally mounted above the tray so that each baffle can freely pivot out of the way to allow material on the tray to be carried under the baffle when the tray is moved in one direction and so that the baffle can hold the material while the tray moves out from under the material when the tray is moving in the other direction. Springs are provided to bias each baffle toward the tray so that the baffle can move away from the tray to prevent damage to the feeder when fibrous or caked material is wedged between the tray and a baffle.

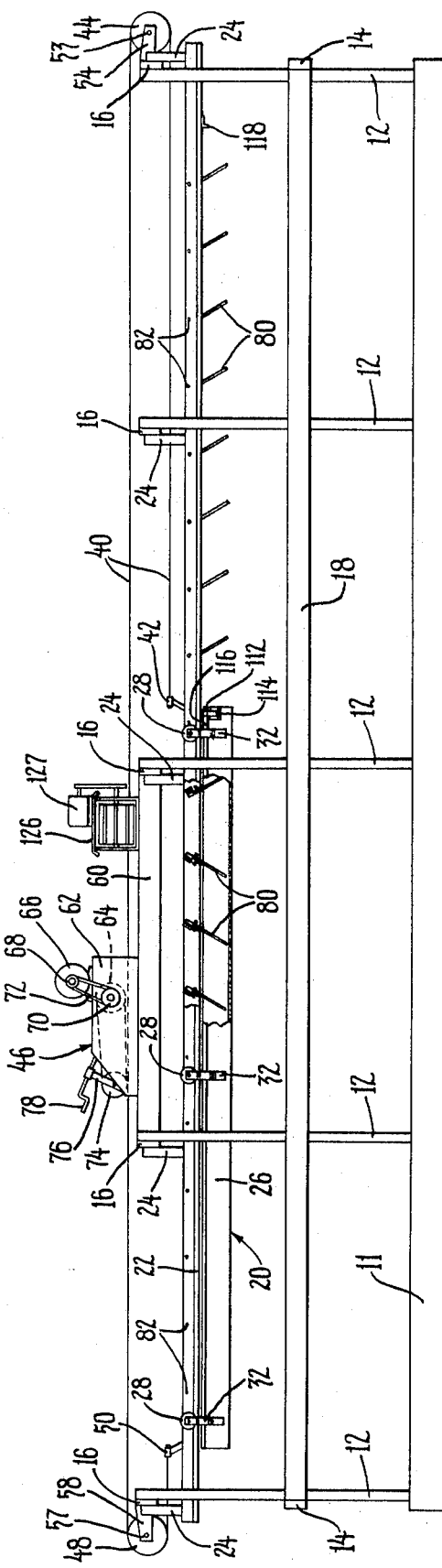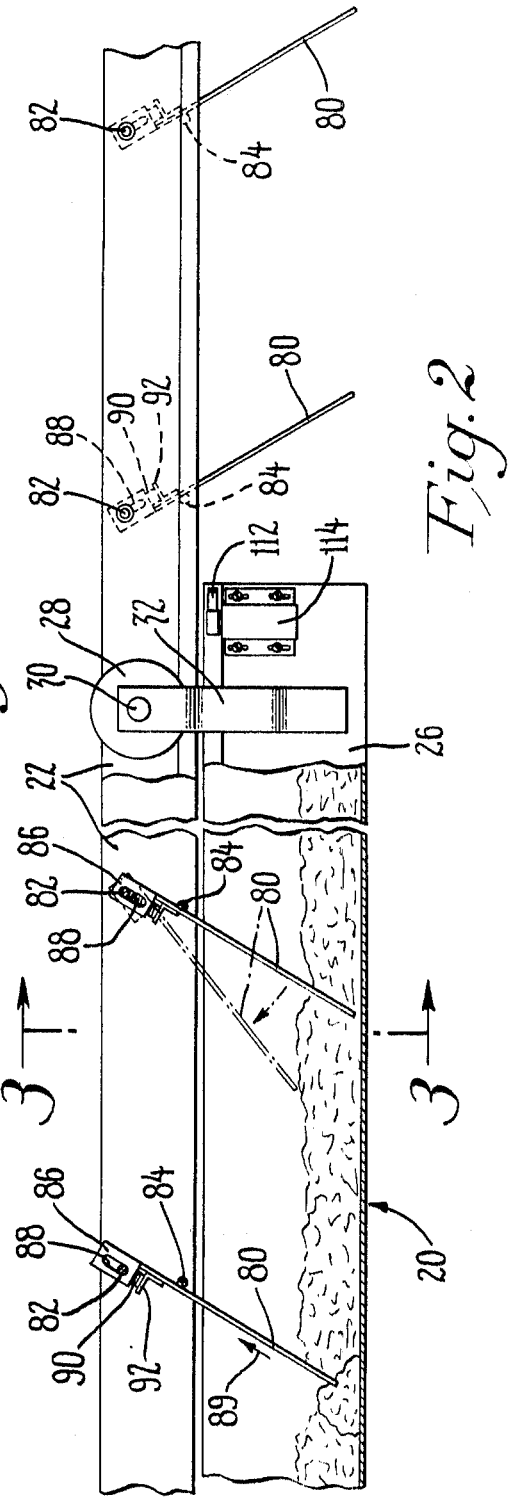

INVENTOR.
GERALD L. SCHOEN
BY
Gerhardt, Greenlee & Farris
ATTORNEYS.

RESILIENT BAFFLE-TYPE RECIPROCATING THROUGH LIVESTOCK FEEDER

This invention relates to livestock feeders for receiving feed for livestock from a supply outlet and for distributing the feed received along the length of an animal feed trough or bunk. Specifically, this invention is directed to an improvement in baffle-type livestock feeders.

Baffle-type feeders include a horizontally reciprocable tray which receives feed from from a central supply outlet and series of swinging baffle members. The baffles are pivoted above the tray to allow feed in the tray to pass beneath them when the tray is moved in one direction. Stops are provided to hold the baffles and thereby hold the feed in the tray stationary until the tray slides out from under the feed as the tray is moved in the other direction.

When the feed being distributed by the baffle-type feeder is fibrous or caked, the feed occasionally wedges between the moving tray and the baffles. This wedging action greatly increases the power required to propel the tray and could damage the baffles.

This invention is directed to a livestock feed distributor which includes an open-ended elongated tray, rails to support the open-ended elongated tray, a reversible drive to propel the tray back and both, and a plurality of baffles pivotally supported above the tray. The baffles pivot freely when the tray carrier material in one direction thereby allowing the material to move under the baffles. Stops are provided to limit pivotal movement of the baffles when the tray moves in the other direction so that material on the tray will be held in place while the tray is pulled from under the material. Springs are provided to bias the baffles toward the bottom of the elongated tray when the baffles are held from swinging about their pivotal supports by the stop means.

In order that the invention may be more fully understood, an embodiment will now be described with reference to the accompanying drawings in which:

FIG. 1 is a side view of the material distributor of this invention;

FIG. 2 is an enlarged fragmentary side view of a portion of the material distributor showing the baffles;

Figure 3:
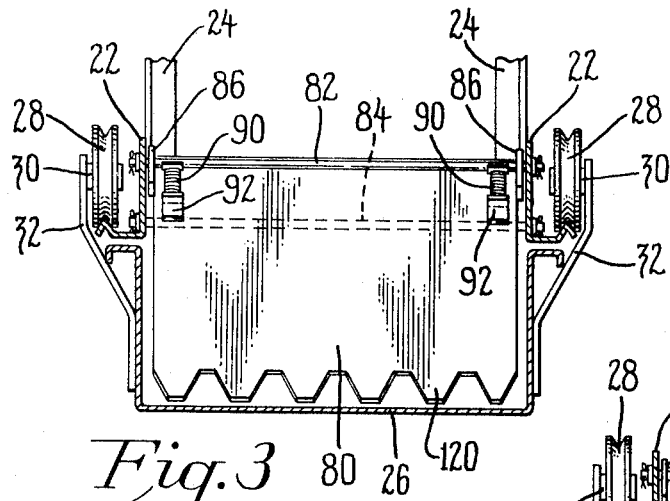
FIG. 3 is an enlarged sectional view of one of the baffles along lines 3–3 of FIG. 2.

A livestock feeding arrangement employing the improved livestock feed distributor of this invention is shown in FIG. 1. The livestock-feeding arrangement includes a feed bunk 10 with sides 11. Uprights 12 are fastened to each of the sides 11 of the feed bunk. Lower cross braces 14 and upper cross braces 16 extend between the uprights 12 on opposite sides of the feed bunk 10. Horizontal members 18 extend the length of the feed bunk on each side a sufficient distance above the sides 11 of the feed bunk so that livestock can eat from the bunk. The horizontal members 18 brace the uprights 12 and keep livestock from climbing into the bunk. A feed distributor 20 is carried above the feed bunk on horizontal rails 22. The rails 22 are supported by hangers 24 which are attached to the upper cross braces 16.

The feed distributor 20 includes an open ended elongated U-shaped material tray 26 supported on the rails 22 by rollers 28. The rollers 28 are rotatably attached by pins 30 to the upper end of the plate members 32. The plate members 32 are rigidly attached to the U-shaped tray 26. The U-shaped tray 26 is preferably one half as long as the bunk 10. A U-shaped tray that length can distribute material over the entire length of the bunk from a central material delivery point.

The feed distributor 20 is propelled along the rails 22 by a cable 40. The cable 40 extends from brackets 42 on one end of the U-shaped tray 26 around a pulley 44 on one end of the feed bunk, to a drive 46, around a pulley 48 on the other end of the feed bunk, and back to a second bracket 50 on the other end of the U-shaped tray 26. The pulley 44 is rotatably supported on a shaft 53 by a pair of brackets 54 which are attached to an upper cross brace 16 at one end of the feed bunk 10. The pulley 48 is rotatably supported at the other end of the feed bunk 10 on a shaft 57 by a pair of brackets 58.

The drive 46 for the cable 40 is mounted above the rails 22 on supports 60. The drive has frame members 62, a drum 64 rotatably supported between the frame members 62, and a reversible motor 66 mounted on top of the frame members to drive the drum 64 through the pulleys 68 and 70 and belt 72. A second drum 74 is rotatably supported on the brackets 76 between the frame members. The cable 40 is wrapped around the drums 64 and 74 as shown by the broken line in FIG. 1. Friction between the drum 64 and the cable causes the U-shaped tray 26 to move when the reversible motor 66 runs. The tension in the cable 40 is adjusted by turning a screw 78 to change the distance between the drums 64 and 74.

A conveyor 126 is mounted above the U-shaped tray 26 near the center of the feed bunk 10. The conveyor 126 is driven by a motor 127 to convey livestock feed from a storage area to the U-shaped tray.

A series of baffles 80 are pivotally mounted above the U-shaped tray 26 on shafts 82 which extend through holes in the rails 22. A series of stops formed by shafts 84 are associated with each baffle 80 to limit the pivotal movement of the baffles 80 in one direction about the shafts 82. The shafts 84 extend through a series of holes in the rails 22 at a level below the shafts 82. The stops formed by the shafts 84 are located to the side of each baffle 80 which faces toward the point where the conveyor 126 deposits material in the U-shaped tray. Thus the baffles 80 are free to pivot about the shafts 82 to permit the U-shaped tray to carry material away from the conveyor 126. The baffles 80 engage the stops formed by the shafts 84 to prevent the U-shaped tray 26 from carrying material toward the conveyor 126. Each divider substantially conforms to the shape of the U-shaped tray 26 as shown in FIGS. 3 and 4 so that all the material in the tray is held in place and deposited upon the bunk as the tray is moved from under the material.

The baffles 80, as shown in FIGS. 2 and 3 each have brackets 86 attached to both upper corners. The brackets 86, which extend at right angles from the plane of the baffles 80, each have an elongated slot 88. Each shaft 82 passes through the elongated slots 88 in the brackets 86 to pivotally support a baffle above the tray 26. Since the long axis of each slot 88 is parallel to the plain of each baffle 80, the baffles can move up relative to the tray 26 by sliding the slotted brackets 86 up, as indicated by the arrow 89 in FIG. 3, relative to the shaft 82.

Springs 90 are provided as shown in FIGS. 2 and 3 to bias the baffles toward the elongated tray 26. The springs 90 are compression springs which exert force against the fixed shafts 82 and angle brackets 92 attached to the baffles 80. If sufficient material is wedged between the lower edge of a baffle and the bottom of the U-shaped tray 26, the springs 90 will be compressed thereby reducing the force applied to the tray by the baffles.

Figure 4:
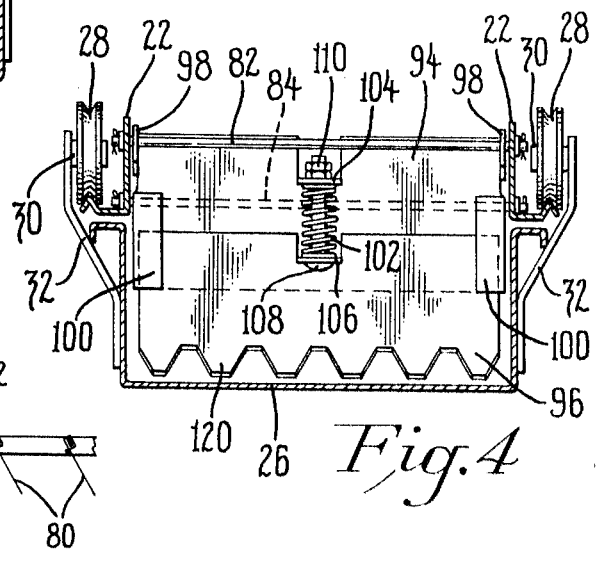
FIG. 4 is an enlarged view similar to FIG. 3 showing a modified form of the baffles and FIGS. 5, 6 and 7 are side views to a reduced scale illustrating the operation of the feed distributor.

An alternate form of the baffles 80 is shown in FIG. 4. This baffle includes an upper section 94 and a lower section 96. The upper section 94 is pivotally supported by a shaft 82 which passes through round holes in the brackets 98 and the rails 22. The lower section 96 of the baffles is telescopically received in guides 100 on each side of the upper section 94. The guides 100 hold the lower section 96 of the baffle in proper alignment with respect to the upper section 94. A compression spring 102 applies force to a flange 104 on the upper section 94 and on a flange 106 on the lower section 96. Movement of the lower section toward the tray 26 is limited by a bolt 108 with lock nuts 110. The bolt 108 also holds the spring 102 in place and can adjust the space between the lower section 96 and the bottom of the tray 26 when the baffle is in its extended position.

Figure 5:
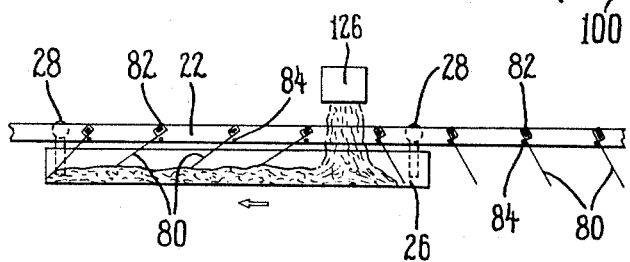
Figure 6:
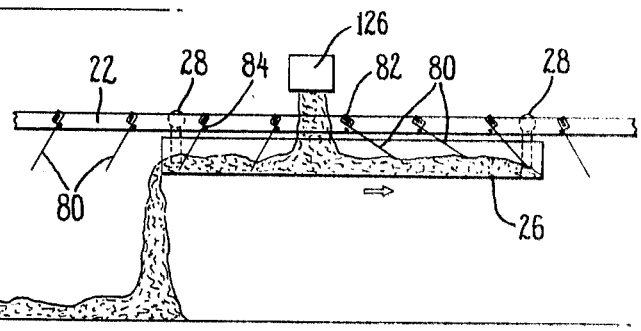
Figure 7:
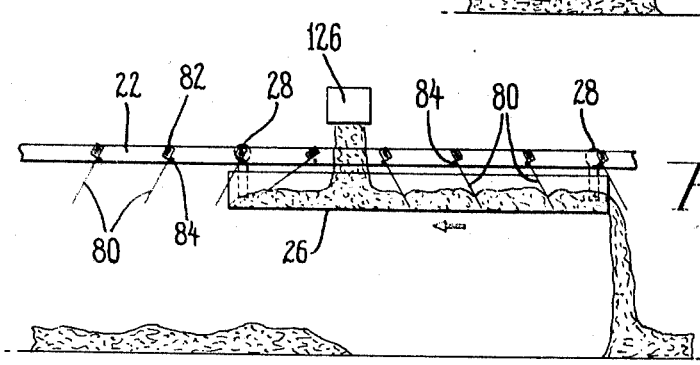

The operation of the livestock feeder is illustrated in FIGS. 5, 6 and 7. During the operation feed is continuously deposited in the elongated U-shaped tray 26 by the conveyor 126. As the tray 26 moves to the left as indicated by the arrow in FIG. 5, the tray is filled with material. The baffles 80 pivot about the shafts 82 thereby allowing the material in the tray 26 to be conveyed under the baffles 80 and away from the conveyor 126. As soon as the tray 26 has traveled to the left end of the feed bunk 10, the arm 112 on the switch 114 contacts a stop 116 on one of the rails 22 thereby reversing the motor 68 and moving the tray to the right as indicated by the arrow in FIG. 6. The baffles 80 to the left of the conveyor 126 pivot about shafts 82 until they contact the stops formed by the shafts 84. If there is excess material between the baffles 80 and the bottoms of the tray 26, as shown in FIG. 2, the springs 90 will be compressed thereby limiting the holding force exerted on the tray 26 by the baffles 80. Without the springs, the baffles 80 could be damaged or the motor 66 could be overloaded and the cost of operation due to power consumption would increase.

As the open-ended tray 26 moves to the right as indicated by the arrow in FIG. 6, the baffles 80 on the left of the conveyor 126 hold the material in place. The material, held in place by the baffles 80 to the left of the conveyor 126, falls to the bunk 10 as the tray 26 moves out from under it. Since the conveyor 126 continues to deliver feed for livestock as the open-ended tray 26 moves to the right, material deposited on the moving tray 26 is carried under the baffles 80 on the right side of the conveyor 126. The arm 112 on the switch 114 contacts a stop 118, when the tray 26 has moved to the right end of the bunk reversing the motor 66 and thus propelling the tray toward the left as shown in FIG. 7. As the open ended tray 26 moves to the left as indicated by the arrow in FIG. 7, the baffles 80 to the right of the conveyor 126 hold the material until the tray 26 is moved from under the material. As the material is falling from the right end of the tray 26, the tray is being filled again by the conveyor 126 and the material is being carried to the left end of the bunk 10. The U-shaped tray 26 continues to reciprocate back and forth distributing material first on one end of the bunk 10 and then on the other end until the desired quantity of material is deposited in the bunk and the drives are stopped.

As shown, the baffles 80 have teeth 120. These teeth give improved performance when distributing material such as silage. For distributing grain, it would probably be desirable not to have teeth.

I claim:

1. A device for distributing material comprising an open-ended elongated tray, at least one rail, rollers rotatably attached to the tray to support the tray on the rail a reversible drive means to propel the tray back and forth along the rail, a plurality of baffles each of said baffles including at least two brackets extending from the upper portion of said baffles and having elongated slots with the long axis of each slot parallel to the plane of each baffle, a shaft passing through the elongated slots in said brackets to pivotally support the baffles above the tray so that at least some of the baffles can pivot out of the way and allow material on the tray to be carried under the baffles when the tray is moved in one direction, stop means to limit pivotal movement of at least some of the baffles when the tray is moved in a second direction to hold the material on the tray in place while the open ended elongated tray is pulled out from under the material held by the baffles, and at least one compression spring contacting the side of each shaft and each of said baffles to bias each baffle toward the tray and away from said shaft when the baffle is held from pivoting about support said shaft by the stop means and constituting a means for allowing each baffle to move away from the bottom of the open-ended tray and toward said shaft to compress the spring and allow clearness when material is wedged between the bottom of the tray and a baffle.

PO-1050
(5/69)

UNITED STATES PATENT OFFICE
CERTIFICATE OF CORRECTION

Patent No.  3,589,339            Dated   June 29, 1971

Inventor(s)   Gerald L. Schoen

It is certified that error appears in the above-identified patent and that said Letters Patent are hereby corrected as shown below:

The title of this patent is wrong and should be changed from RESILIENT BAFFLE-TYPE RECIPROCATING THROUGH LIVESTOCK FEEDER to

RESILIENT BAFFLE-TYPE RECIPROCATING TROUGH LIVESTOCK FEEDER.

Signed and sealed this 7th day of December 1971.

(SEAL)
Attest:

EDWARD M. FLETCHER, JR.          ROBERT GOTTSCHALK
Attesting Officer                Acting Commissioner of Patents